United States Patent [19]
Delaporte et al.

[11] Patent Number: 5,168,521
[45] Date of Patent: Dec. 1, 1992

[54] METHOD OF EXECUTING AN IRREGULAR PERMUTATION OF DATA PROTECTED BY ENCRYPTION

[75] Inventors: Xavier Delaporte, Trappes; Benoît Leterrier, Verrieres le Buisson, both of France

[73] Assignee: U.S. Philips Corp., New York, N.Y.

[21] Appl. No.: 558,125

[22] Filed: Jul. 24, 1990

[30] Foreign Application Priority Data

Jul. 25, 1989 [FR] France .................... 89 10003

[51] Int. Cl.$^5$ ............................ H04L 9/06
[52] U.S. Cl. ........................ 380/29; 380/28; 380/37
[58] Field of Search ................ 235/379, 380; 380/22-25, 28-30, 37

[56] References Cited

U.S. PATENT DOCUMENTS 4,255,811  3/1981  Adler ...................... 380/37
4,536,647  8/1985  Atalla et al. ............. 235/379
4,816,651  3/1989  Ishording ................. 235/379

OTHER PUBLICATIONS

"Software Data Encryption Standard" IBM Technical Disclosure Bulletin, vol. 29, No. 12, May 1987, pp. 5594-5595.
"Data Encryption Standard" FIPS PUB 46, Jan. 15, 1977.
"Data Encryption Standard" FIPS PUB 46-1, Jan. 22, 1988.

Primary Examiner—Bernarr E. Gregory
Attorney, Agent, or Firm—Jack D. Slobod

[57] ABSTRACT

This method of processing data protected by encryption is particularly suitable for smart cards utilizing the DES system. The method enables the execution of the irregular permutation of the key on the basis of a correspondence table, which operation is most costly as regards processing time and code length in the cited system. The method involves the decomposition of the initial permutation into a plurality of elementary permutations so that the majority thereof is performed on at least two bits, the bits of the various octets of the key being marked, a masking system being applied in order to extract the appropriate bits for their permutation in the positions predetermined by the correspondence table.

7 Claims, 1 Drawing Sheet

METHOD OF EXECUTING AN IRREGULAR PERMUTATION OF DATA PROTECTED BY ENCRYPTION

FIELD OF THE INVENTION

The invention relates to a method of executing an irregular permutation during the processing of binary data protected by encryption for a smart card, the encryption being realized in the form of a series of input data transformations, involving extraction of a secret key evolving during each iteration step, the irregular permutation being executed on the secret key on the basis of a correspondence table. During such permutation an input bit, received on a particular input position, is mapped onto a particular output position.

BACKGROUND OF THE INVENTION

Such processing of binary data protected by encryption for smart cards is described in the publication "Federal Information Processing Standards Publication" (FIPS PUB 46), Jan. 15, 1977, National Bureau of Standards of the US Department of Commerce which was last reaffirmed Jan. 22, 1988 as FIPS PUB 46-1. This publication proposes a standard processing for the input data as well as for the secret key, and notably permutations to be executed thereon on the basis of one or more correspondence tables. When such an operation is performed on the data used within a smart card, such execution must be as fast and also as compact as possible, the length of the code permissible for a smart card being very limited. Therefore, the execution of the permutation on the key is costly as regards processing time and code length. For the execution of an irregular permutation, there are customarily two methods. The first method consists in the execution of each permutation on one bit after the other, the second method consisting of reading in the correspondence table the destination address of each bit in succession. The first method is comparatively fast but costly as regards code length, the second method necessitates only a very short program but takes a long time for executing.

SUMMARY OF THE INVENTION

The present invention proposes a method of the kind set forth which, however, does not have the drawbacks of the known methods. In particular, it provides a very advantageous trade-off. So, it enables optimum execution of this operation by substantially increasing the processing speed while maintaining a limited code length.

To this end, the method of executing an irregular permutation of the kind set forth is characterized in that said irregular permutation to be executed on a number of n bits is decomposed into a number of n' elementary permutations, the number n' being smaller than the number n, the elementary permutations being executed so that the majority thereof is executed on at least two bits, for which purpose for each line of the correspondence table there is performed a marking of bits relating to the first octet of the key, subsequently to the second octet of the key and so on until the last octet is reached, which marking enables the creation of a masking system in order to extract the relevant bits for their permutation in the positions predefined by the correspondence table.

Thus, such a method enables the execution of permutations which are irregular and hence completely asymmetrical on a large number of bits while avoiding the bit-wise execution which is costly as regards time and code length. Actually, the concept combining the decomposition into elementary permutations, the distribution of suitable bits, and the use of a masking system enables optimum execution of re-arrangements and hence permutations by 2 or even by 3 bits, thus resulting in a substantial reduction of the execution time for the entire permutation.

DESCRIPTION OF THE PREFERRED EMBODIMENT

Figure 1:
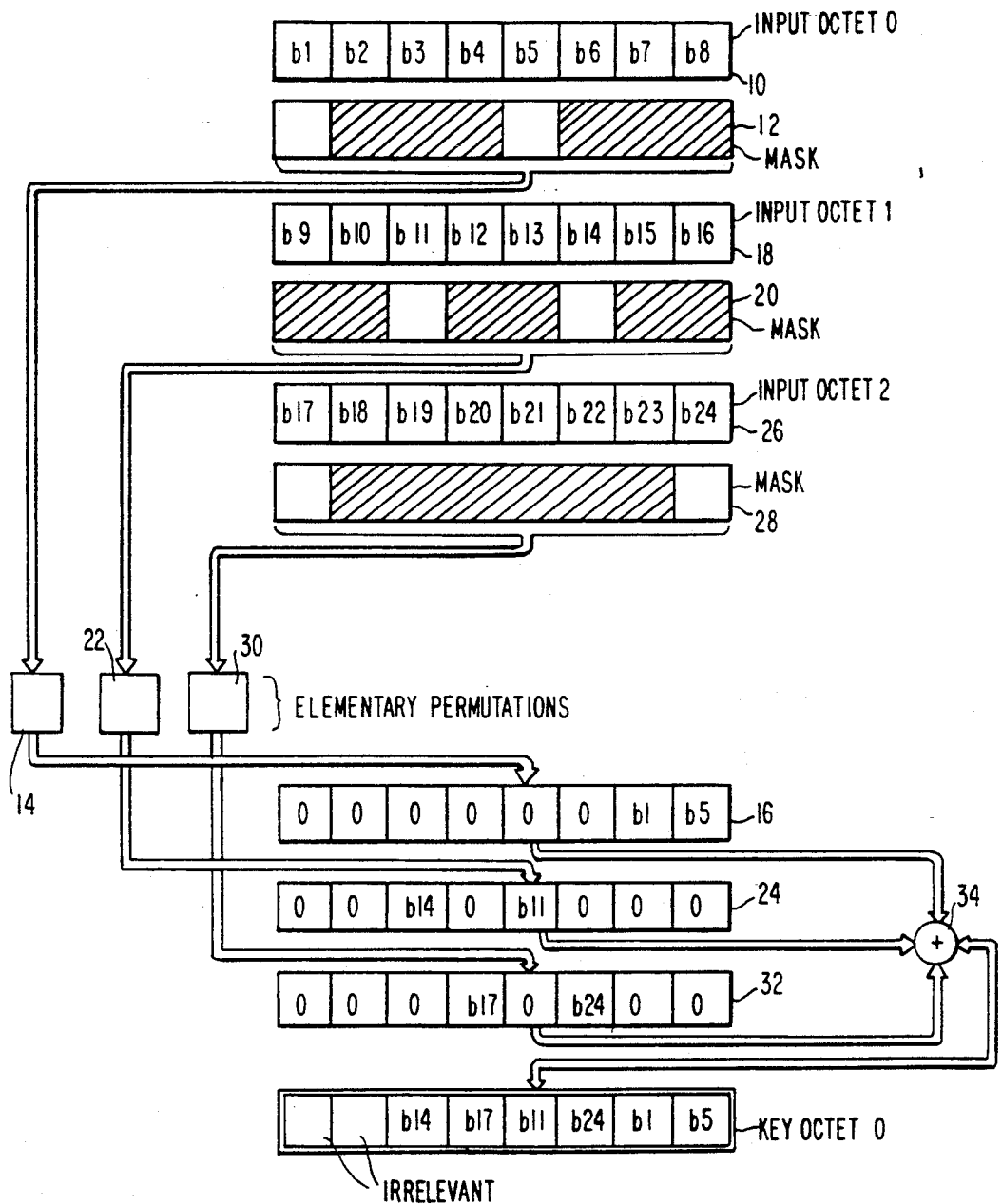
FIG. 1 is a schematic illustration of the formation of a zeroeth output octet in accordance with the invention.

This type of method is particularly suitable for the processing of data protected by encryption for smart cards utilising the DES system as described in the cited publication (FIPS PUB 46). Therefore, in accordance with the system the key is compressed from a block of 56 bits into 48 bits after rotation and is permuted on the basis of a correspondence table which is referred to as a PC-2 table (for a Permuted Choice 2) in accordance with said standard. This operation is considered to be the most costly operation of the DES system as far as processing time and code length are concerned. Even though the method in accordance with the invention does not offer a substantial reduction of the length of the code, it in any case enables a very substantial reduction of the processing time (in the order of 50%).

Now, for each of the seven octets of the input block the inventive process consists in marking the bits intended for the first sextet of the output permuted key, subsequently, those intended for the second sextet and so on through those intended for the eigth sextet of the output prmuted key. This marking enables the formation of masks each corresponding to an associated input octet-related marking operation in order to extract the relevant bits, the continuation of the process consisting in the permutation of the bits obtained so that they correspond exactly to the positions defined by the table PC-2.

Actually the eight sextets of the output permuted key are formed as eight key octets, but only the six bits situated at the right hand side of each output octet are significant, the two bits at the left hand side being disregarded. The seven input octets and the eight output octets are each numbered 0, 1, 2, . . . The zeroeth input octet contains bits 1 through 8 of the 56 bit input block, the first, bits 9 through 16, the second, bits 17–24, and so on. In the following table it is illustrated how the last six bits of the output octets are obtained from the bits $b1-b56$ of the key input block in accordance with said PC-2 table; the number of the input octet containing each bit is indicated in parenthesis, for the purpose of facilitating consideration of dependencies:

| OUTPUT OCTET | | | INPUT BIT NO. (INPUT OCTET) | | | | |
|---|---|---|---|---|---|---|---|
| $O_0 =$ | X | X | b14(1) | b17(2) | b11(1) | b24(2) | b1(0) | b5(0) |

-continued

| OUTPUT OCTET | | | INPUT BIT NO. (INPUT OCTET) | | | | | |
|---|---|---|---|---|---|---|---|---|
| $O_1 =$ | X | X | b3(0)  | b28(3) | b15(1) | b6(0)  | b21(2) | b10(1) |
| $O_2 =$ | X | X | b23(2) | b19(2) | b12(1) | b4(0)  | b26(3) | b8(0)  |
| $O_3 =$ | X | X | b16(1) | b7(0)  | b27(3) | b20(2) | b13(1) | b2(0)  |
| $O_4 =$ | X | X | b41(5) | b52(6) | b31(3) | b37(4) | b47(5) | b55(6) |
| $O_5 =$ | X | X | b30(3) | b40(4) | b51(6) | b45(5) | b33(4) | b48(5) |
| $O_6 =$ | X | X | b44(5) | b49(6) | b39(4) | b56(6) | b34(4) | b53(6) |
| $O_7 =$ | X | X | b46(5) | b42(5) | b50(6) | b36(4) | b29(3) | b32(3) |

The method of the invention is illustrated in FIG. 1 of the drawing as applied to forming the zeroeth output octet $O_0$ of the permuted key. The zeroeth input octet 10 is indicated since from the above table it is noted that the bits b1 and b5 (which are also at bit positions 1 and 5 in the zeroeth input octet) contribute to the zeroeth output octet. The operations performed are a mask operation 12 which forms the masked octet below containing only those two bits, and zeros:

b1 0 0 0 b5 0 0 0 and an elementary permutation operation 14 which permutes the masked octet to a resultant octet 16 by moving the bits b1 and b5 to the position indicated by the above table.

The first input octet 18 is also indicated since from the above table it is noted that the bits b11 and b14, which are respectively at bit positions 3 and 6 within the first input octet, contribute to the zeroeth output octet. These bits are extracted by a similar masking operation 20 and then permuted by a similar elementary permutation operation 22 to produce the resultant octet 24.

Further, the second input octet 26 is indicated and the masking operation 28 and elementary permutation operation 30 are applied to produce the resultant octet 32. The resultant octets 16, 24, and 30 are combined by an OR operation 34 and thereby form the zeroeth key octet 36, since according to the above table it is contributed to only by bits in the zeroeth through second input octets. Preferably, for execution by a microprocessor, the indicating of the input octets contributing to the considered key octet is sequential, each time ORing the resultant octet into a previously obtained cumulated resultant octet.

Each of the eight output octets is formed in a similar manner, wherein those input octets contributing to the considered key octet are each indicated, and the masking, permutation and OR operations are sequentially applied to the indicated input octets.

As should now be apparent, from an examination of the above table, there are 30 different dependencies of output octets upon input octets, each representing at least a masking operation for extracting the relevant bits. Twenty-nine of these masking operations are followed by a permutation operation to change the position of the extracted bit(s), while the remaining one of these masking operations actually extracts the relevant bit in proper position (see bit b28 which is in the fourth bit position in both the first key octet and the third input octet).

The linear processing of these 29 permutations is costly as regards code length but certainly constitutes the fastest method. This operation is performed by means of 8-bit microprocessors such as a Motorola 6805 or an Intel 8048. The fastest operation has been achieved by means of the microprocessor 8048.

Specifically, the method of executing an irregular permutation in accordance with the invention for the processing of data protected by encryption for smart cards utilising the DES system is characterized in that it is performed in the following steps, that is to say for each octet of the key:

a) separately indicating each input octet which contributes at least one bit to the considered output octet b) loading the value of the mask applicable to the considered output octet and the indicated input octet;

c) masking between the accumulator and the contents of the input octet to produce a masked octet d) permutation of the masked e) execution of a logic OR-function with the preceding result f) storage of the result in a buffer register for the considered output octet.

Such a method can be performed on any irregular permutation, the principle being that it is easier to execute several permutations on one, two or three bits than to execute a single permutation on a large number of bits. The method does not offer a substantial gain as regards code length, but offers a very substantial reduction of the execution time for the permutation.

We claim:

1. In a data processing device, a method of execution of a permutation of an input key comprising an input block of bits, subdivided into a plurality of input groups, into an output key comprising an output block of bits, subdivided into a plurality of output groups, in accordance with a table, pursuant to the DES standard, indicating for each bit in the output block a source location in said input block, said method comprising:

for each output group of said plurality of output groups, indicating separately each input group of said plurality of input groups which according to said table contains one or more source locations for respective one or more bits in said output group;

for each input group so indicated, forming a resulting group by first applying a masking operation to the input group so indicated to extract a masked group having in one or more bit positions corresponding to said one or more source locations, one or more bits from said one or more source locations and a constant bit value in the other bit positions, and second applying one or more permutations to said masked group necessary to move said one or more bits from said one or more source locations in position to correspond in position to the one or more bits in the output group having said one or more source locations in said input group so indicated; and combining said resulting groups with a logical operation which for each bit position in said resulting groups produces an output bit of a predetermined value in response to any bit in said bit position in said resulting groups being different in value from said constant bit value.

2. A method as claimed in claim 1, wherein said input groups are octets and said output groups are sextets.

3. A method as claimed in claim 1, wherein said data processing device is a smart card protected by encryption according to the DES standard using said input key.

4. A method as claimed in claim 1 wherein said constant bit value is logical zero and said logical operation is OR.

5. In a data processing device, a method of execution of a permutuation of an input key comprising an input block of bits, subdivided into a plurality of input octets, into an output key comprising an output block of bits, formed by concatenating at least subgroups from a plurality of output octets, in accordance with a table, pursuant to the DES standard, indicating for each bit in the output block a source location in said input block, said method comprising:

for each output octet of said plurality of output octets, indicating separately each input octet of said plurality of input octets which according to said table contains one or more source locations for respective one or more bits in said output octet;

for each input octet so indicated, extracting and positioning one or more bits from said one or more source locations to correspond in position to the one or more bits in said output octet having said one or more source locations in said input octet; and forming said output octet having said one or more source locations in each input octet so indicated by combining the one or more bits so extracted and positioned from each input octet so indicated in a manner maintaining the positions of the one or more bits so extracted and positioned.

6. A method As claimed in claim 5, wherein said subgroups are sextets.

7. A method as claimed in claim 6, wherein said data processing device is a smart card protected by encryption according to the DES standard using said input key.

* * * * *